(No Model.)
W. DURYEA.
APPARATUS FOR THE MANUFACTURE OF STARCH.
No. 263,030. Patented Aug. 22, 1882.
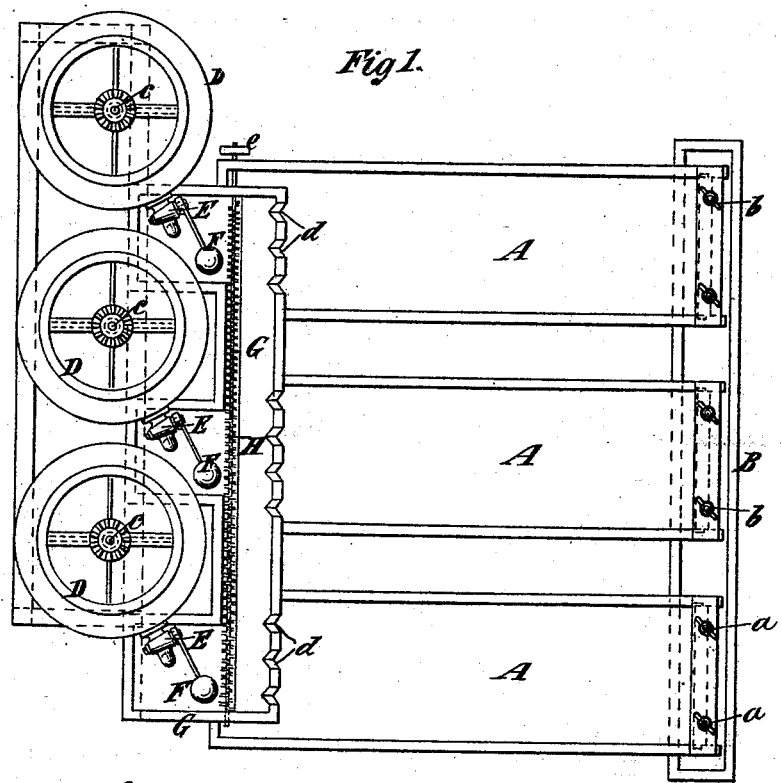
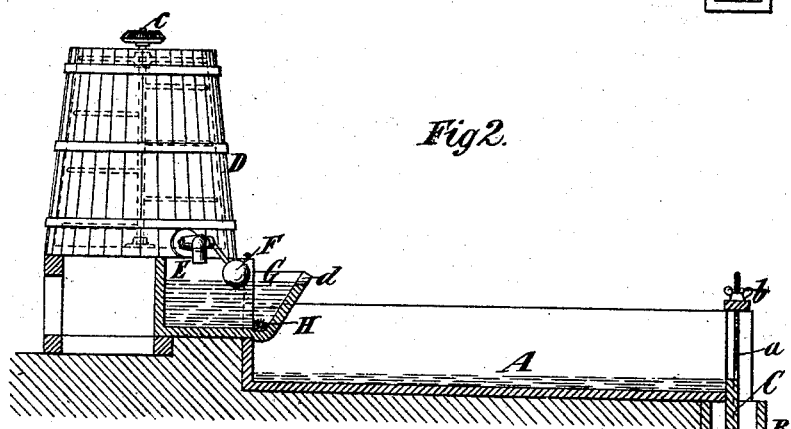

United States Patent Office.

WRIGHT DURYEA, OF BROOKLYN, NEW YORK.

APPARATUS FOR THE MANUFACTURE OF STARCH.

SPECIFICATION forming part of Letters Patent No. 263,030, dated August 22, 1882.

Application filed July 8, 1882. (No model.)

*To all whom it may concern:*

Be it known that I, WRIGHT DURYEA, of the city of Brooklyn, in the county of Kings and State of New York, have invented a new and useful Improvement in Apparatus for the Manufacture of Starch, of which the following is a specification.

In the manufacture of starch the final settling operation is performed by allowing the starch-water to run over or through long troughs or runs in which the starch is deposited while the water flows off.

The object of my invention is to regulate the velocity of the flow of starch-water over the trough or run, and thus cause the water to flow slowly enough to insure the depositing of all the starch. This I effect by controlling automatically the delivery of starch-water from the tank which supplies said trough or run; and the invention consists in the combination, with a trough or run and a supply tank or vat provided with a delivery or outlet valve, of an intermediate receptacle into which the water is delivered from the tank or vat, and from which the water overflows with said trough or run, and a float connected with said valve and serving to control it by the level of water in said intermediate receptacle. I also combine with the above-described intermediate receptacle a stirrer which is adapted to be rotated therein for the purpose of agitating its contents and prevent the starch from settling therein.

In the accompanying drawings, Figure 1 represents a plan view of my improved apparatus, and Fig. 2 represents a vertical longitudinal section thereof.

Similar letters of reference designate corresponding parts in both figures.

A designates the starch-troughs, of which three are here represented. The bottoms of these troughs or runs may be slightly inclined, and at their lower ends is a tank or trough, B, in which the water is received from the settling troughs or runs A. The delivery of water from each of the troughs or runs is controlled by a vertically-adjustable gate or dam, C, which may be raised or lowered by a screw, $a$, and nut $b$; but such adjustable gate forms no part of my present invention.

At the higher end of the troughs or runs A are tanks or vats D, from which the starch-water is delivered, and which are here represented as three in number; but a single tank might be used. Each of the tanks or vats is represented as provided with a vertical shaft, $c$, carrying arms or stirrers, and adapted to be rotated by any suitable mechanism, so as to keep the starch in suspension in the tank or vat and prevent its settling therein. Each of the tanks or vats D is provided with a delivery cock or valve, E, to the plug or stem of which is connected a float, F. The valve may be of any suitable kind, and the float may be applied in any suitable way so that it will effect the opening and closing of the valve by rising and falling.

G designates an intermediate receptacle, which receives the starch-water from all the tanks or vats D, and from which the water overflows into the troughs or runs A. Opposite and above each trough or run the edge of the intermediate receptacle, G, is cut down or notched at $d$, so that the water will overflow at such points.

Instead of employing a single intermediate receptacle, G, one might be used for each tank and trough or run, and instead of three tanks D being used, one tank or vat and one intermediate receptacle might be used to deliver water to any number of troughs or runs.

The one or more tanks or vats D might be arranged at a considerable distance from the intermediate receptacle, G, and be provided each with a pipe leading to the intermediate receptacle, and each pipe would be provided, adjacent to said intermediate receptacle, with a cock or valve and float.

The floats F rest upon the water in the intermediate receptacle, and as its level rises or falls the valves or cocks E are closed or opened to a corresponding extent, and thus automatically control the delivery of water from the tanks or vats D into the receptacle G, and also from the receptacle to the troughs or runs A. Thus I control the velocity of the flow through the trough or run and insure its being slow enough to deposit all or nearly all the starch.

It is desirable to prevent the starch from settling in the intermediate receptacle, G, and to this end I arrange therein a rotary brush or stirrer, H, which is represented as provided with a pulley, e, over which a belt may be passed for rotating it. This stirrer agitates the water in the receptacle and keeps the starch in suspension therein.

What I claim as my invention, and desire to secure by Letters Patent, is—

1. The combination, with a trough or run and a supply tank or vat provided with a delivery or outlet valve, of an intermediate receptacle into which the starch-water is to be delivered from the tank or vat, and from which the water is to flow into said trough or run, and a float connected with said valve and serving to control it by the level of water in said intermediate receptacle, substantially as herein described.

2. The combination, with a trough or run and a supply tank or vat provided with a delivery or outlet valve, of an intermediate receptacle for receiving starch-water from said tank or vat and delivering it to said trough or run, a float connected with said valve and serving to control it by the level of water in said intermediate receptacle, and a stirrer in said intermediate receptacle for preventing the starch settling therein, substantially as herein described.

WRIGHT DURYEA.

Witnesses:
A. F. SAMSON,
EDWARD HAWKINS, Jr.